(12) United States Patent
Morimoto et al.

(10) Patent No.: US 10,614,270 B2
(45) Date of Patent: Apr. 7, 2020

(54) TERMINAL DEVICE, COMMUNICATION SYSTEM, RECORDING MEDIUM

(71) Applicant: SEIKO EPSON CORPORATION, Tokyo (JP)

(72) Inventors: Keiichi Morimoto, Shiojiri (JP); Kenji Sakuda, Hamamatsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/258,316

(22) Filed: Jan. 25, 2019

(65) Prior Publication Data
US 2019/0228192 A1 Jul. 25, 2019

(30) Foreign Application Priority Data
Jan. 25, 2018 (JP) ................................. 2018-010385

(51) Int. Cl.
*G06K 7/10* (2006.01)
*H04W 76/11* (2018.01)
(Continued)

(52) U.S. Cl.
CPC ....... *G06K 7/10138* (2013.01); *G06F 21/608* (2013.01); *G06K 7/10297* (2013.01);
(Continued)

(58) Field of Classification Search
CPC .......... G06K 7/10138; G06K 7/10297; H04W 76/15; H04W 76/11; H04W 36/0069; H04W 36/0027
See application file for complete search history.

(56) References Cited

U.S. PATENT DOCUMENTS

2013/0215467 A1* 8/2013 Fein ...................... G06F 3/1204
358/1.15
2014/0197927 A1* 7/2014 Kwon .................. H04B 5/0062
340/10.1
(Continued)

FOREIGN PATENT DOCUMENTS

EP 2811720 A2 12/2014
EP 2811720 A3 4/2015
(Continued)

OTHER PUBLICATIONS

Extended European Search Report issued in Application No. 19153433 dated Apr. 25, 2019.

*Primary Examiner* — Thomas D Alunkal
(74) *Attorney, Agent, or Firm* — Workman Nydegger (57) ABSTRACT

A terminal device includes a first communication unit that performs a wireless communication with a wireless communication tag of an electronic equipment in accordance with a first communication method, a second communication unit that performs the wireless communication in accordance with a second communication method, and a processing unit. The first communication unit receives an identification information of the electronic equipment from the wireless communication tag and the second communication unit receives a beacon signal including the identification information of the electronic equipment and an identifier of an internal access point. The processing unit establishes the wireless communication with the electronic equipment in accordance with the second communication method using the identifier specified based on a collation process between the identification information received by the first communication unit and the identification information included in the beacon signal.

10 Claims, 5 Drawing Sheets

(51) Int. Cl.

| | | |
|---|---|---|
| *H04W 36/00* | (2009.01) | |
| *H04W 76/15* | (2018.01) | |
| *H04L 29/06* | (2006.01) | |
| *H04W 88/06* | (2009.01) | |
| *H04W 12/00* | (2009.01) | |
| *G06F 21/60* | (2013.01) | |
| *H04W 4/80* | (2018.01) | |
| *H04W 84/12* | (2009.01) | |
| *H04W 88/08* | (2009.01) | |
| *G06F 3/12* | (2006.01) | |
| *H04L 29/12* | (2006.01) | |
| *H04W 76/10* | (2018.01) | |

(52) U.S. Cl.
CPC ............ *H04L 63/083* (2013.01); *H04L 63/18* (2013.01); *H04W 4/80* (2018.02); *H04W 12/003* (2019.01); *H04W 36/0027* (2013.01); *H04W 36/0069* (2018.08); *H04W 76/11* (2018.02); *H04W 76/15* (2018.02); *H04W 84/12* (2013.01); *H04W 88/06* (2013.01); *H04W 88/08* (2013.01); *G06F 3/1204* (2013.01); *G06F 3/1236* (2013.01); *G06F 3/1292* (2013.01); *H04L 61/6022* (2013.01); *H04W 12/00407* (2019.01); *H04W 76/10* (2018.02)

(56) References Cited

U.S. PATENT DOCUMENTS

| | | | | |
|---|---|---|---|---|
| 2014/0355063 | A1* | 12/2014 | Jang | ............ G06F 3/1205 |
| | | | | 358/1.15 |
| 2015/0097030 | A1* | 4/2015 | Gallo | ............ H04B 5/0031 |
| | | | | 235/439 |
| 2015/0359021 | A1* | 12/2015 | Tsujii | ............ H04W 4/80 |
| | | | | 455/41.1 |
| 2017/0272591 | A1* | 9/2017 | Odaira | ............ H04N 1/00477 |

FOREIGN PATENT DOCUMENTS

| | | |
|---|---|---|
| EP | 2961078 A | 12/2015 |
| JP | 2015-231155 A | 12/2015 |

* cited by examiner

TERMINAL DEVICE, COMMUNICATION SYSTEM, RECORDING MEDIUM

BACKGROUND

1. Technical Field

The present invention relates to a terminal device, a communication system, a recording medium, and the like.

2. Related Art

In the related art, a terminal device, that is capable of communicating using a plurality of communication methods and establishes a connection with an electronic equipment in accordance with a second communication method using information acquired by a communication in accordance with a first communication method, is known. In other words, the terminal device that switches the connection to the second communication method by using a communication result from the first communication method, is known. Hereinafter, switching of such a communication method will also be referred to as handover.

JP-A-2015-231155 discloses a technique in which a terminal device is moved close to a near field communication (NFC) tag mounted printer, is caused to read handover information from the NFC tag, and is connected to the printer by a wireless LAN method using the handover information. The handover information is a service set identifier (SSID) of an internal access point of the printer.

Some wireless communication tags do not assume rewriting of stored information. For example, printers of a low price range, there is an equipment equipped with a wireless communication tag not having an interface with a main control substrate of a printer, and rewriting of the stored information is not performed in the wireless communication tag.

With such a wireless communication tag, if a user changes information for connection such as an SSID, the change cannot be reflected in the information stored in the wireless communication tag. As a result, since the SSID after the change and the SSID read from the wireless communication tag by the terminal device do not match, a connection between the terminal device and the electronic equipment cannot be established. A technique of generating the SSID of the internal access point is conceivable based on a MAC address read from the wireless communication tag after rewriting the MAC address of the electronic equipment in the wireless communication tag. However, also in this case, since the SSID generated from the MAC address is the SSID before the change, it is similar in that the connection between the terminal device and the electronic equipment cannot be established.

SUMMARY

An advantage of some aspects of the invention is to provide a terminal device, a communication system, a program, and the like that can appropriately execute switching of a connection from a communication method using a wireless communication tag to another communication method.

According to an aspect of the invention, there is provided a terminal device including a first communication unit that performs a wireless communication with a wireless communication tag of an electronic equipment in accordance with a first communication method, a second communication unit that performs a wireless communication with the electronic equipment in accordance with a second communication method capable of performing a higher speed communication than the first communication method, and a processing unit that performs a communication control of the first communication unit and the second communication unit, in which the first communication unit receives an identification information of the electronic equipment from the wireless communication tag by the wireless communication in accordance with the first communication method, in which the second communication unit receives a beacon signal which includes the identification information of the electronic equipment and an identifier of an internal access point of the electronic equipment and which is compliant with the second communication method, from the electronic equipment, and in which the processing unit specifies the identifier of the internal access point of the electronic equipment based on a collation process between the identification information of the electronic equipment received by the first communication unit and the identification information included in the beacon signal, and causes the second communication unit to establish the wireless communication with the electronic equipment in accordance with the second communication method using the specified identifier.

The identifier of the internal access point of the electronic equipment is specified based on the collation process between the identification information of the electronic equipment received from the wireless communication tag in accordance with the first communication method and the identification information of the electronic equipment included in the beacon signal received in accordance with the second communication method. In other words, the identifier of the internal access point is specified using information in which a change of the identification information of the electronic equipment 200 is not assumed. In this way, even in a situation where the identifier is changed, it is possible to appropriately switch a connection from the first communication method to the second communication method.

A rewritability identifier, which indicates whether or not rewriting of information stored in the wireless communication tag is possible, may be stored in the wireless communication tag, the first communication unit may receive the rewritability identifier from the wireless communication tag by the wireless communication in accordance with the first communication method, and the processing unit may select any one of a plurality of specifying processes for specifying the identifier of the internal access point based on the rewritability identifier, executes the selected specifying process, and specify the identifier of the internal access point.

In this way, it is possible to appropriately change the process depending on whether or not the information stored in the wireless communication tag can be rewritten.

The identification information of the electronic equipment may be stored in the wireless communication tag in which information to be stored cannot be rewritten, the identifier of the internal access point may be stored in the wireless communication tag in which information to be stored can be rewritten. In a case where the rewritability identifier indicates that the information stored in the wireless communication tag cannot be rewritten, the processing unit may specify the identifier of the internal access point based on the collation process between the identification information received by the first communication unit from the wireless communication tag in which information cannot be rewritten and the identification information included in the beacon signal. In a case where the rewritability identifier indicates that the information stored in the wireless communication tag can be rewritten, the processing unit may specify the identifier of the internal access point received by the first communication unit from the wireless communication tag in which information can be rewritten as the identifier used for a communication with the electronic equipment in accordance with the second communication method.

In this way, it is possible to appropriately set the information to be stored in the wireless communication tag depending on whether or not the information stored in the wireless communication tag can be rewritten, and based on the information stored in the wireless communication tag It is possible to properly specify the identifier of the internal access point.

In a case where the rewritability identifier indicates that the information stored in the wireless communication tag cannot be rewritten, the processing unit may perform a generation process of a password associated with the identifier based on the identification information received by the first communication unit from the wireless communication tag in which information cannot be rewritten.

In this way, when the information stored in the wireless communication tag cannot be rewritten, it is possible to appropriately generate the password associated with the identifier.

In a case where the identifier of the internal access point is specified based on the collation process between the identification information received from the wireless communication tag and the identification information included in the beacon signal and a connection with the electronic equipment using the specified identifier and the password generated by the generation process is not established, the processing unit may determine that the password of the internal access point is changed and perform a notification process for prompting a user to reset the password.

In this way, when it is estimated that the connection cannot be established due to a password change, it is possible to prompt the user to respond appropriately.

According to another aspect of the invention, there is provided a communication system including the terminal device according to any one of the above and the electronic equipment, in which the electronic equipment includes a processing unit, and in which the processing unit of the electronic equipment performs a process for receiving a change request of the identifier of the internal access point from a user.

It is possible to flexibly change the identifier of the internal access point, and possible to improve user convenience.

The processing unit of the electronic equipment may perform a process for initializing the identifier and a password associated with the identifier.

In this way, it is possible to restore the electronic equipment to an appropriate state when the connection cannot be established due to the password change or the like.

According to still another aspect of the invention, there is provided a non-transitory computer-readable recording medium in which a program is recorded, the program that causes a computer to function as a first communication unit that performs a wireless communication with a wireless communication tag of an electronic equipment in accordance with a first communication method, a second communication unit that performs a wireless communication with the electronic equipment in accordance with a second communication method capable of performing a higher speed communication than the first communication method, and a processing unit that performs a communication control of the first communication unit and the second communication unit, in which the first communication unit receives an identification information of the electronic equipment from the wireless communication tag by the wireless communication in accordance with the first communication method, in which the second communication unit receives a beacon signal which includes the identification information of the electronic equipment and an identifier of an internal access point of the electronic equipment and which is compliant with the second communication method, from the electronic equipment, and in which the processing unit specifies the identifier of the internal access point of the electronic equipment based on a collation process between the identification information of the electronic equipment received by the first communication unit and the identification information included in the beacon signal, and causes the second communication unit to establish the wireless communication with the electronic equipment in accordance with the second communication method using the specified identifier.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the present embodiment will be described. Note that, the present embodiment described below does not unreasonably limit the content of the invention described in the aspects. In addition, all of the configurations described in the present embodiment are not necessarily indispensable constitutional requirements of the invention.

1. Configuration Example of Communication System

Figure 1:
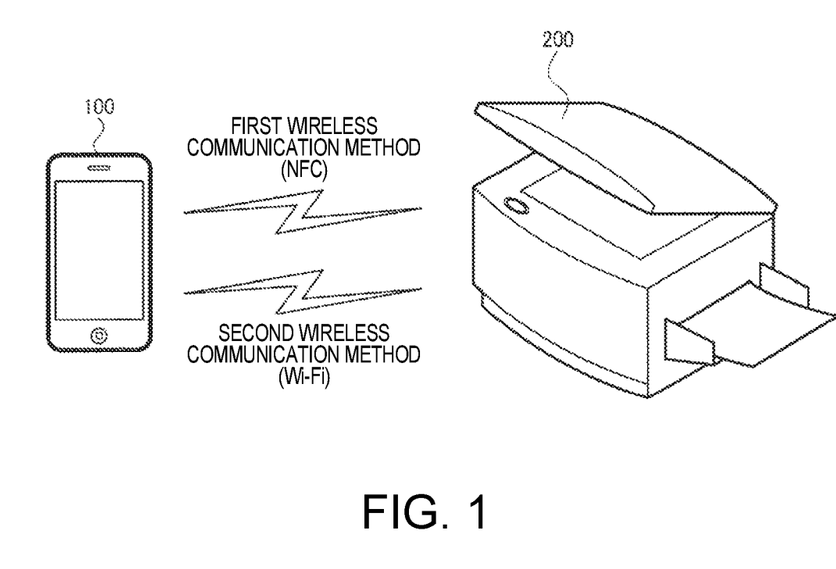
FIG. 1 is a configuration example of a communication system.

FIG. 1 is a diagram schematically showing an example of a communication system 10 of the present embodiment. The communication system 10 includes a terminal device 100 and an electronic equipment 200.

The terminal device 100 is a portable terminal device such as a smart phone or a tablet terminal. The electronic equipment 200 is, for example, a printer (printing device). Alternatively, the electronic equipment 200 may be a scanner, a facsimile device, or a copying machine. The electronic equipment 200 may be a multifunction peripheral (MFP)

having a plurality of functions, and a multifunction peripheral having a printing function is also an example of a printer.

The terminal device 100 and the electronic equipment 200 can perform a wireless communication compliant with a first communication method and can perform the wireless communication compliant with a second communication method. The first communication method is a method using a wireless communication tag, specifically, a communication method compliant with an NFC protocol (ISO/IEC18092). The second communication method is a communication method having a higher communication speed than the first communication method, specifically, a communication method compliant with the wireless LAN protocol (IEEE 802.11). An example in which the second communication method is Wi-Fi (registered trademark) will be described below. Although not shown in FIG. 1, the terminal device 100 and the electronic equipment 200 may be connected to an external access point by a communication compliant with the Wi-Fi standard.

Figure 2:
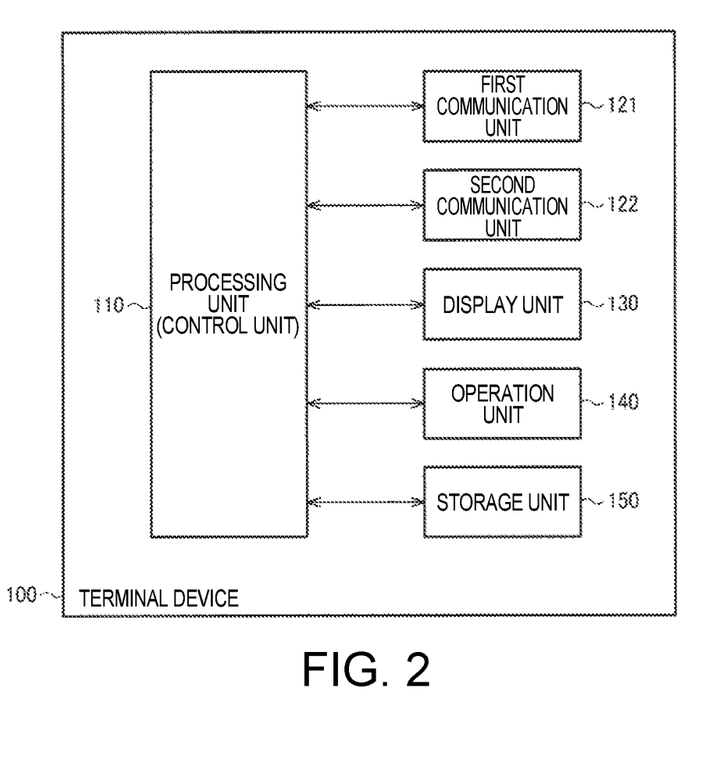
FIG. 2 is a configuration example of a terminal device.

FIG. 2 is a block diagram showing an example of a configuration of the terminal device 100. The terminal device 100 includes a processing unit 110 (processor), a first communication unit 121 (first communication interface), a second communication unit 122 (second communication interface), a display unit 130 (display), an operation unit 140 (operation button, or the like), and a storage unit 150 (memory).

The processing unit 110 (processor, controller) controls each unit of the first communication unit 121, the second communication unit 122, the display unit 130, the operation unit 140, and the storage unit 150.

Each process (each function) of the present embodiment performed by the processing unit 110 can be realized by a processor (a processor including a hardware). For example, each process of the present embodiment can be realized by a processor that operates based on information such as a program and a memory (storage device) that stores information such as a program. In the processor here, for example, functions of each unit may be realized by an individual hardware, or functions of each unit may be realized by an integrated hardware. For example, the processor may include a hardware, which the hardware may include at least one of a circuit for processing digital signals and a circuit for processing analog signals. For example, the processor can be configured with one or a plurality of circuit devices (for example, an IC, or the like) mounted on a circuit substrate, or one or a plurality of circuit elements (for example, a resistor, a capacitor, or the like). The processor may be, for example, a central processing unit (CPU). However, the processor is not limited to a CPU, and various processors such as a graphics processing unit (GPU) or a digital signal processor (DSP) can be used. The processor may be a hardware circuit based on an application specific integrated circuit (ASIC). The processor may be configured with a plurality of CPUs, or may be configured with a hardware circuit based on a plurality of ASIC. Further, the processor may be configured with a combination of a plurality of CPUs and a hardware circuit based on a plurality of ASIC.

The first communication unit 121 is a communication device (communication interface, wireless communication chip) for communicating with an external equipment in accordance with the first communication method. The second communication unit 122 is a communication device for communicating with an external equipment in accordance with the second communication method.

The display unit 130 is configured with a display or the like for displaying various kinds of information to a user, and the operation unit 140 is configured with a button or the like for receiving an input operation from a user. Note that, the display unit 130 and the operation unit 140 may be integrally configured in a touch panel. Further, the terminal device 100 may include a notification unit for notifying a user in a mode other than display. The notification unit may be, for example, a speaker for notifying by sound, a vibrating unit for notifying by vibration, or a combination thereof.

The storage unit 150 (storage device, memory) stores various kinds of information such as data or a program. The processing unit 110, the first communication unit 121, the second communication unit 122, and the like operate the storage unit 150 as a work area. The storage unit 150 may be a semiconductor memory such as a static random access memory (SRAM) or a dynamic random access memory (DRAM), may be a register, may be a magnetic storage device such as a hard disk device (HDD: hard disk drive), or may be an optical storage device such as an optical disk device. For example, the storage unit 150 stores computer readable instructions, and functions of each unit of the terminal device 100 are realized by executing the instructions by the processing unit 110 (processor). The instruction may be an instruction of an instruction set configuring a program or an instruction instructing an operation to a hardware circuit of the processing unit 110.

Figure 3:
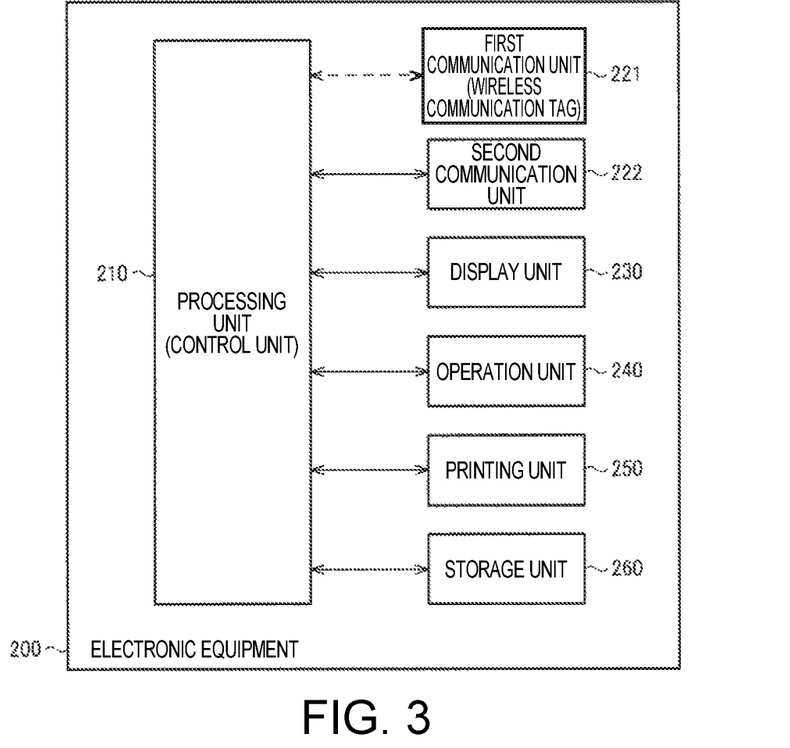
FIG. 3 is a configuration example of an electronic equipment.

FIG. 3 is a block diagram showing an example of a configuration of the electronic equipment 200. Note that, FIG. 3 shows the electronic equipment 200 (printer, multi-function peripheral) having a printing function. However, a point that the electronic equipment 200 can be extended to other than a printer is as described above. The electronic equipment 200 includes a processing unit 210 (processor), a first communication unit 221 (first communication interface), a second communication unit 222 (second communication interface), a display unit 230 (display), an operation unit 240 (operation panel), a printing unit 250, and a storage unit 260 (memory).

The processing unit 210 (processor, controller) controls each unit (communication unit, storage unit, printing unit, or the like) of the electronic equipment 200 and performs various processes of the present embodiment. For example, the processing unit 210 may include a plurality of CPUs such as a main CPU, a sub CPU, or the like. The main CPU provided in a main control substrate controls each unit of the electronic equipment 200 or performs overall control of the electronic equipment 200. The sub CPU performs various processes for printing, when the electronic equipment 200 is a printer, for example. Alternatively, a CPU for a communication process may be further provided.

Each process of the present embodiment performed by the processing unit 210 can be realized by a processor. For example, each process of the present embodiment can be realized by a processor that operates based on information such as a program and a memory that stores information such as a program. In the processor here, for example, functions of each unit may be realized by an individual hardware, or functions of each unit may be realized by an integrated hardware. For example, the processor may include a hardware, which the hardware may include at least one of a circuit for processing digital signals and a circuit for processing analog signals. For example, the processor can be configured with one or a plurality of circuit devices mounted on a circuit substrate, or one or a plurality of circuit elements. The processor may be, for example, a CPU. However, the processor is not limited to a CPU, and various processors such as a GPU or a DSP can be used. The processor may be a hardware circuit based on an ASIC. The processor may be configured with a plurality of CPUs, or may be configured with a hardware circuit based on a plurality of ASIC. Further, the processor may be configured with a combination of a plurality of CPUs and a hardware circuit based on a plurality of ASIC.

The first communication unit 221 is a wireless communication tag configured to perform a wireless communication compliant with the first communication method. Specifically, the first communication unit 221 is an NFC tag configured to perform a communication in accordance with a NFC standard. Information for connecting to an internal access point of the electronic equipment 200 is written in a storage medium inside a tag of the first communication unit 221. Details of the information stored in the wireless communication tag will be described later.

As indicated by a broken line in FIG. 3, depending on a configuration of the electronic equipment 200, the first communication unit 221 may have an interface with the processing unit 210 or may not have the interface with the processing unit 210. For example, presence or absence of an interface is determined according to a model of the electronic equipment 200. The interface with the processing unit 210 may be referred to an interface with a main control substrate of the electronic equipment 200, specifically, it can be realized by various interfaces such as an I2C or the like. In order to simplify the description, the presence of an interface with the processing unit 210 is represented as "with I/F", and the absence of an interface with the processing unit 210 is represented as "without I/F".

In a case where the wireless communication tag is provided "with I/F", a storage medium inside the wireless communication tag of the first communication unit 221 is configured to be rewritable by the processing unit 210. That is, the processing unit 210 can appropriately update the information stored in the wireless communication tag. On the other hand, in a case where the wireless communication tag is provided "without I/F", a storage medium inside the wireless communication tag of the first communication unit 221 is configured not to be rewritable by the processing unit 210. That is, the processing unit 210 cannot update the information stored in the wireless communication tag.

The second communication unit 222 is a communication device for communicating with an external equipment in accordance with the second communication method. The second communication unit 222 has a function of wirelessly connecting to the external equipment via an external access point and has a function of wirelessly connecting to an external equipment without going through the external access point. The second communication unit 222 functions as an access point (internal access point) for the external equipment when establishing a wireless connection with the external equipment without going through the external access point. That is, the electronic equipment 200 can establish a wireless connection with the terminal device 100 connected to a network to which the external access point is a parent in an infrastructure mode. Further, it is also possible that the electronic equipment 200 itself becomes a parent and establishes a peer-to-peer wireless connection with another terminal device 100.

The display unit 230 is configured with a display or the like for displaying various kinds of information to a user, and the operation unit 240 is configured with a button or the like for receiving an input operation from a user. Note that, the display unit 230 and the operation unit 240, for example, may be integrally configured in a touch panel.

The printing unit 250 includes a printing engine. The printing engine is a mechanical configuration for executing printing of an image on a printing medium. The printing engine includes, for example, a transporting mechanism, an ink jet type ejecting head, a driving mechanism of a carriage including the ejecting head, or the like. The printing engine prints an image on the printing medium by ejecting ink from the ejecting head to the printing medium (paper or cloth) transported by the transporting mechanism. The specific configuration of the printing engine is not limited to the one exemplified here, and it may be one that prints with toner using a laser type.

The storage unit 260 (storage device, memory) stores various kinds of information such as data or a program. The processing unit 210 and the second communication unit 222, for example, operate the storage unit 260 as a work area. The storage unit 260 may be a semiconductor memory, a register, a magnetic storage device, or an optical storage device.

2. Detail of Processes

Next, the processes of the present embodiment will be described in detail. As disclosed in JP-A-2015-231155, a technique of performing a handover between different communication methods, is widely known. In a case of a handover from NFC to Wi-Fi, the first communication unit 121 of the terminal device 100 reads connection information from the wireless communication tag of the electronic equipment 200, and specifies an SSID of the internal access point of the electronic equipment 200 based on the connection information.

The first communication unit 121 may directly read the SSID and the password from the wireless communication tag. Alternatively, the first communication unit 121 may read the identification information of the electronic equipment 200 from the wireless communication tag, and the processing unit 110 may generate the SSID and the password based on the identification information. Specifically, the processing unit 110 performs a generation process of the SSID and the password by being operated in accordance with a connection application stored in the storage unit 150. The identification information of the electronic equipment 200 is, for example, a MAC address. The process of generating the SSID and the password from the MAC address can be realized by a conversion process in accordance with any conversion rules such as a hash function. The conversion rule here is a rule that, for example, satisfies conditions that one SSID is always generated from one MAC address and the possibility of duplication of the SSID generated from different MAC addresses is sufficiently low.

Generally, an initial value of the SSID is a character string set by a manufacturer or the like of the electronic equipment 200. In order to avoid the duplication of SSID, the SSID may be an enumeration of alphabets or numbers that are difficult for a user to understand. On the other hand, convenience can be improved by setting the SSID to be a character string easy to understand for the user. For example, it is easy to specify the electronic equipment 200 from the SSID by including a meaningful character string such as a department or floor in which the electronic equipment 200 is placed or a purpose of use of the electronic equipment 200 in the SSID.

Therefore, the electronic equipment 200 of the communication system 10 according to the present embodiment includes the processing unit 210, and the processing unit 210 performs a process for receiving a change request of the identifier of the internal access point from the user. The communication system 10 here is a system including the terminal device 100 and the electronic equipment 200 as shown in FIG. 1. Further, the identifier is information for specifying the internal access point of the electronic equipment 200, specifically an SSID.

However, as described above, there are cases where the wireless communication tag of the electronic equipment 200 is provided "with I/F" and "without I/F". When the wireless communication tag is provided "without I/F", the information stored in the wireless communication tag cannot be rewritten by the processing unit 210 of the electronic equipment 200. Therefore, if the SSID of the internal access point is changed by the user operation, the change cannot be reflected on the wireless communication tag.

When the SSID is stored in the wireless communication tag, the SSID read by the first communication unit 121 of the terminal device 100 is the SSID before change. When the MAC address is stored in the wireless communication tag, the MAC address is effective information as information for identifying the electronic equipment 200. However, since content of the process of generating the SSID from the MAC address performed by the processing unit 110 of the terminal device 100 is fixed, the SSID generated by the processing unit 110 is still the SSID before change. In either case, since the SSID acquired by the terminal device 100 and the SSID after the change of the electronic equipment 200 do not match, a connection in accordance with the second communication method cannot be established.

As shown in FIG. 2, the terminal device 100 according to the present embodiment includes the first communication unit 121 that performs the wireless communication with the wireless communication tag of the electronic equipment 200 in accordance with a first communication method, the second communication unit 122 that performs the wireless communication with the electronic equipment 200 in accordance with a second communication method capable of performing a higher speed communication than the first communication method, and the processing unit 110 that performs a communication control of the first communication unit 121 and the second communication unit 122. The first communication unit 121 receives the identification information of the electronic equipment 200 from the wireless communication tag by the wireless communication in accordance with the first communication method. The second communication unit 122 receives the beacon signal including the identification information of the electronic equipment 200 and the identifier of the internal access point of the electronic equipment 200, which is a beacon signal compliant with the second communication method, from the electronic equipment 200. Then, the processing unit 110 specifies the identifier of the internal access point of the electronic equipment 200 based on the collation process between the identification information of the electronic equipment 200 received by the first communication unit 121 and the identification information included in the beacon signal. By using the specified identifier, the processing unit 110 causes the second communication unit 122 to establish the wireless communication with the electronic equipment 200 in accordance with the second communication method.

As in the example described above, in the following description, it is assumed that the first communication method is a NFC, the second communication method is a Wi-Fi, the identification information of the electronic equipment 200 is a MAC address, and the identifier of the internal access point is an SSID as appropriate. The identification information of the electronic equipment 200 may be information that can specify the device. Also other information such as an individual identification number given by the manufacturer for each device may be used for the identification information of the electronic equipment 200. Further, the identifier of the internal access point may be information that can specify the internal access point. Also information other than the SSID may be used for the identifier of the internal access point. For example, the second communication method can be expanded other than the Wi-Fi if the communication speed is faster than the first communication method, and the identifier of the internal access point differs according to the specific standard of the second communication method.

The first communication unit 121 receives the identification information of the electronic equipment 200 from the wireless communication tag. Hereinafter, receiving information by bringing the terminal device 100 close to the wireless communication tag is referred to as "NFC touch" as appropriate.

Figure 4:
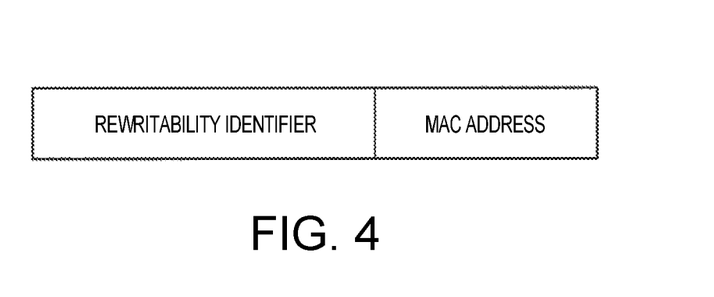
FIG. 4 is a data structure example of information included in a wireless communication tag.

FIG. 4 shows a data structure example of information stored in the wireless communication tag "without I/F". As shown in FIG. 4, a rewritability identifier and a MAC address that is identification information of the electronic equipment 200 are stored in the wireless communication tag. The rewritability identifier is an identifier representing whether or not the information stored in the wireless communication tag can be rewritten by the processing unit 210. The rewritability identifier is a first value when rewritable, and a second value when rewriting is impossible. The first value and the second value may be different values, and may be a character string or a numeric value. The rewritability identifier may be one bit flag information. In a case of FIG. 4, the second value representing that rewriting is impossible is written as the rewritability indicator.

The beacon signal compliant with the second communication method is a signal for the second communication unit 222 of the electronic equipment 200 to broadcast the identifier of the internal access point to a peripheral equipment.

Figure 5:
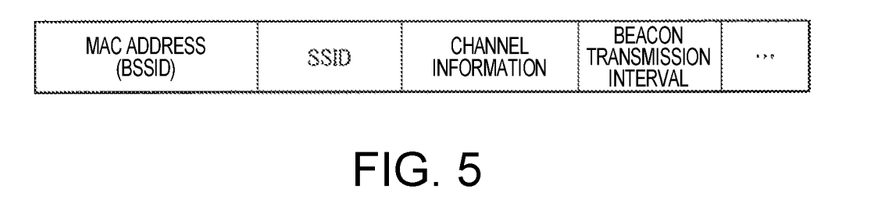
FIG. 5 is a data structure example of a beacon signal transmitted from the electronic equipment.

FIG. 5 shows a data structure example of a beacon signal. The beacon signal is information including at least the MAC address which is the identification information of the electronic equipment 200 and the SSID of the internal access point. Also, as shown in FIG. 5, the beacon signal may include channel information or other information such as a transmission interval of the beacon signal. The channel information is information for specifying a communication frequency and is information for specifying any one of 1 to 13 channels or 1 to 14 channels in the 2.4 GHz bandwidth.

As can be seen from FIGS. 4 and 5, the terminal device 100 of the present embodiment can acquire the MAC address which is the identification information of the electronic equipment 200 by the communication using each of the first communication unit 121 and the second communication unit 122. In a case where the MAC address acquired by the "NFC touch" matches to the MAC address acquired by the beacon signal, it can be determined that the electronic equipment 200, which is a target of the "NFC touch", that is, the electronic equipment 200 to be a target of the connection request with the Wi-Fi, is the same device as the transmission source device of the beacon signal. That is, the processing unit 110 can specify that the SSID included in the beacon signal is the SSID of the electronic equipment 200 to be a target of the connection request.

Figure 6:
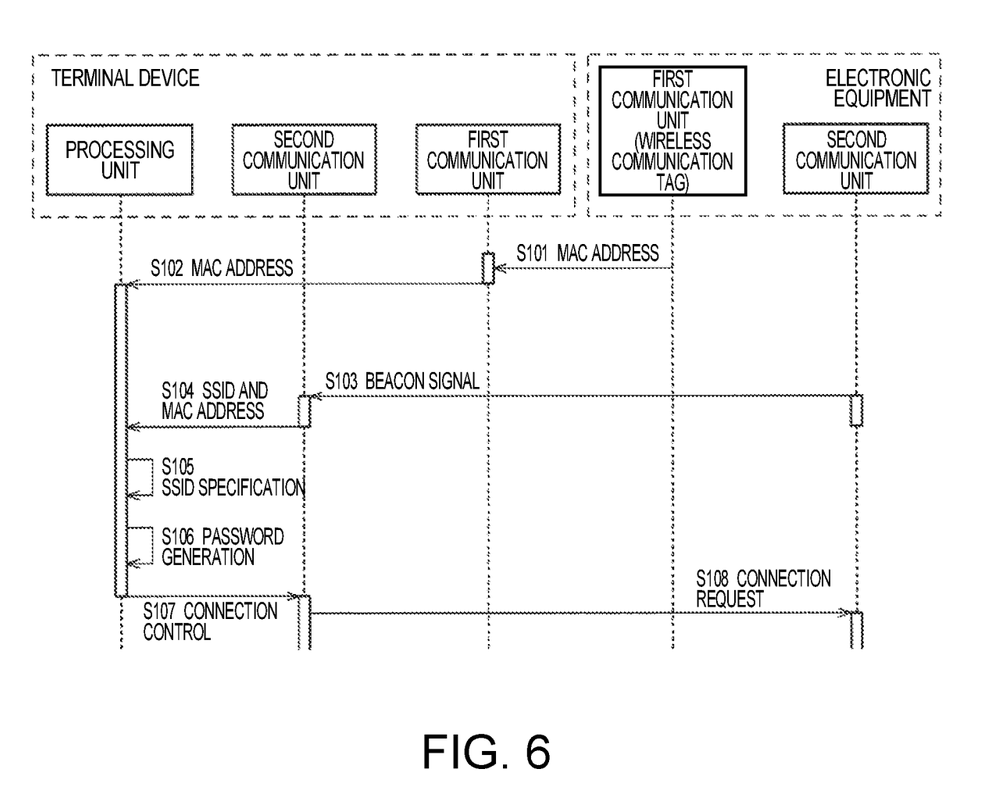
FIG. 6 is an explanatory diagram of a connection sequence of a present embodiment.

FIG. 6 is a diagram illustrating a connection sequence between the terminal device 100 of the present embodiment and the electronic equipment 200 having the wireless communication tag "without I/F". The first communication unit 121 of the terminal device 100 receives a MAC address of the electronic equipment 200 from the wireless communication tag of the electronic equipment 200 by "NFC touch" (S101), and the processing unit 110 acquires the MAC address (S102).

The second communication unit 122 of the terminal device 100 receives a beacon signal to be broadcasted by the second communication unit 222 of the electronic equipment 200 at a given interval (S103), and the processing unit 110 receives the beacon signal included in the beacon signal (S104). In FIG. 6, an example in which a beacon signal is received after "NFC touch", the order of processing is not limited to this. For example, the processing unit 110 may store the information of the received beacon signal in the storage unit 150, read the information of the beacon signal stored in the past from the storage unit 150 when the "NFC touch" is performed, and execute the subsequent processes.

Upon completion of the reception of the information by the "NFC touch" and the reception of the beacon signal, the processing unit 110 performs the collation process of the MAC address of the electronic equipment 200 and specifies the SSID of the electronic equipment 200 (S105). Specifically, as described above, it is determined whether the MAC address of S102 matches the MAC address of S104, if they match, the SSID acquired with the MAC address of S104 is specified as the SSID of the electronic equipment 200.

Further, in order to establish a connection with the internal access point of the electronic equipment 200, a password as well as the SSID is required. The password here may be extended to a pass phrase. Based on the identification information received by the first communication unit 121, the processing unit 110 performs a generation process of a password associated with the identifier. Specifically, the processing unit 110 generates a password of the internal access point of the electronic equipment 200 based on the MAC address of the electronic equipment 200 (S106). Generation of a password is realized by a conversion processing or the like according to any conversion rules as in the above example. In a narrow sense, the generation process of the password is executed on a condition that the wireless communication tag is "without I/F". That is, in a case where the rewritability identifier indicates that the information stored in the wireless communication tag cannot be rewritten, a password is generated based on the identification information received by the first communication unit 121 from the wireless communication tag that cannot be rewritten.

In S105 and S106, the SSID of the internal access point of the electronic equipment 200 and the password are specified. Therefore, the processing unit 110 instructs the second communication unit 122 to connect with the electronic equipment 200 using the specified SSID and password (S107). The second communication unit 122 performs the connection request to the second communication unit 222 (the internal access point of the electronic equipment 200) of the electronic equipment 200 (S108). As for specific packet transmission and reception after S108, it is sufficient to follow a known procedure compliant with the Wi-Fi standard, so a detailed description thereof will be omitted.

As described above, according to the technique of the present embodiment, the SSID is specified based on the collation process of the MAC address received using the different communication method. The MAC address is information unique to the equipment of the electronic equipment 200 and is information that is not changed even when the SSID is changed. Thereby, even when the wireless communication tag of the electronic equipment 200 is "without I/F", it is possible to properly follow the change of the SSID and establish the connection between the terminal device 100 and the electronic equipment 200 in accordance with the second communication method. In other words, even when the wireless communication tag "without I/F" is used, the handover from the NFC to the Wi-Fi can be appropriately realized.

As described above, it is also conceivable that a case where the wireless communication tag of the electronic equipment 200 is "with I/F". The MAC address of the electronic equipment 200 is stored in the wireless communication tag "with I/F", and the handover from the NFC to the Wi-Fi can be realized by using the same technique as in the case "without I/F" described above with reference to FIG. 6.

However, in the technique shown in FIG. 6, a password associated with the SSID is generated based on the MAC address of the electronic equipment 200. Since it is assumed that the conversion rule for generating a password from the MAC address is also fixed, when the password is changed, the password to be generated in the process of S106 will not match the password after the change.

If the wireless communication tag is "with I/F", the information stored in the wireless communication tag can be updated in accordance with the change when the SSID or the password is changed. Accordingly, there is little need to perform the same process as "without I/F" for the "with I/F".

Figure 7:
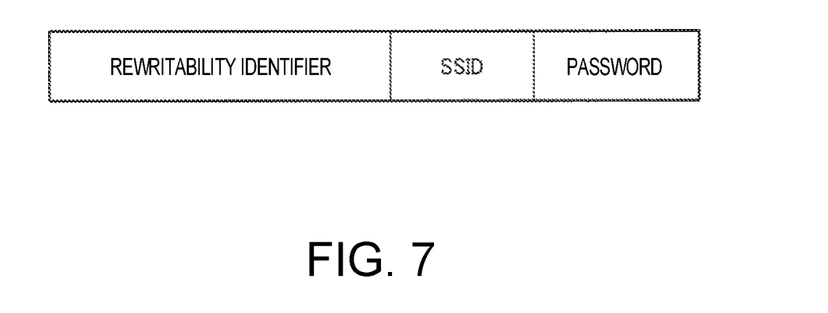
FIG. 7 is a data structure example of information included in the wireless communication tag.

FIG. 7 shows a data structure example of information stored in the wireless communication tag "with I/F". As shown in FIG. 7, the wireless communication tag "with I/F" stores the rewritability identifier, the SSID of the internal access point of the electronic equipment 200, and the password associated with the SSID. The rewritability identifier is similar to the example of FIG. 4, and in this case, the first value representing that rewriting is possible is written. The SSID and the password are appropriately rewritten by the processing unit 210.

Figure 8:
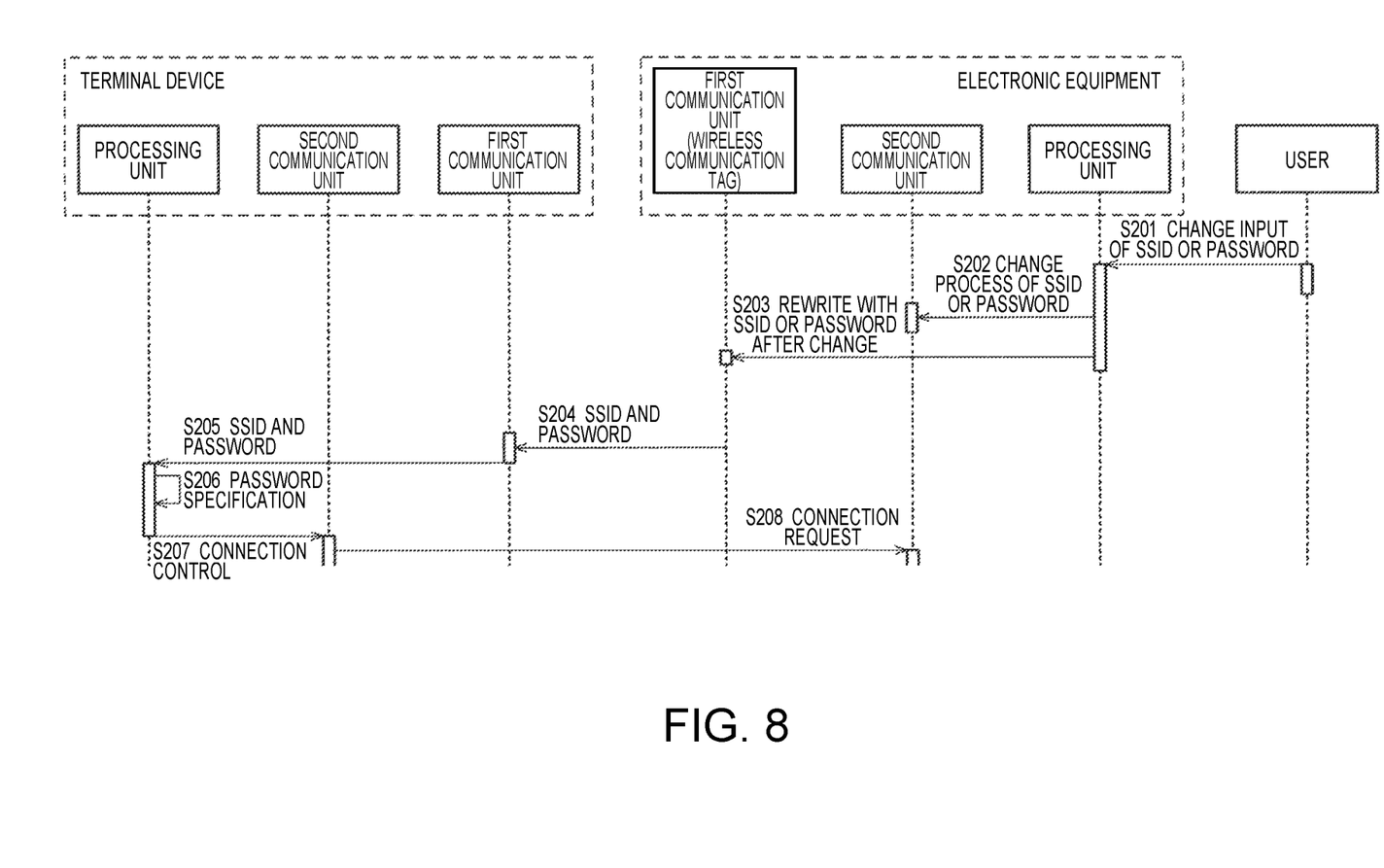
FIG. 8 is an explanatory diagram of a connection sequence of the present embodiment.

FIG. 8 is a diagram illustrating a connection sequence between the terminal device 100 of the present embodiment and the electronic equipment 200 having the wireless communication tag "with I/F". S201 to S203 represent a change operation of at least one of the SSID and the password by a user. First, the user performs the change operation of the SSID or the password to the electronic equipment 200 (S201). The process of S201 is performed using the operation unit 240 of the electronic equipment 200. When the electronic equipment 200 is already connected to a given external device directly or via an external access point, the process of S201 may be performed using the external device.

When receiving an operation input from the user, the processing unit 210 of the electronic equipment 200 performs a process of changing the SSID or the password to the second communication unit 222 (S202). In addition, the processing unit 210 performs a process of overwriting the SSID or the password after the change with the first communication unit 221 (wireless communication tag) via an interface (S203). In this manner, the SSID and the password after the change match to the SSID and the password stored in the wireless communication tag. After processing of S202 or S203, rebooting of the second communication unit 222 or rebooting of the electronic equipment 200 itself may be executed as necessary.

When connecting the terminal device 100 to the internal access point of the electronic equipment 200, the user first performs "NFC touch". The first communication unit 121 of the terminal device 100 receives the SSID and the password of the internal access point from the wireless communication tag of the electronic equipment 200 by the "NFC touch" (S204), and the processing unit 110 acquires the SSID and the password (S205).

In the case of "with I/F", the processing unit 110 can acquire the SSID and the password necessary for the connection by the process of S205. That is, the specifying process of the SSID in this case, is a process of specifying the SSID received from the wireless communication tag as the SSID of the internal access point of the electronic equipment 200 (S206). The processing unit 110 instructs the second communication unit 122 to connect with the electronic equipment 200 using the specified SSID and password (S207). The second communication unit 122 performs the connection request to the second communication unit 222 of the electronic equipment 200 (S208).

Figure 9:
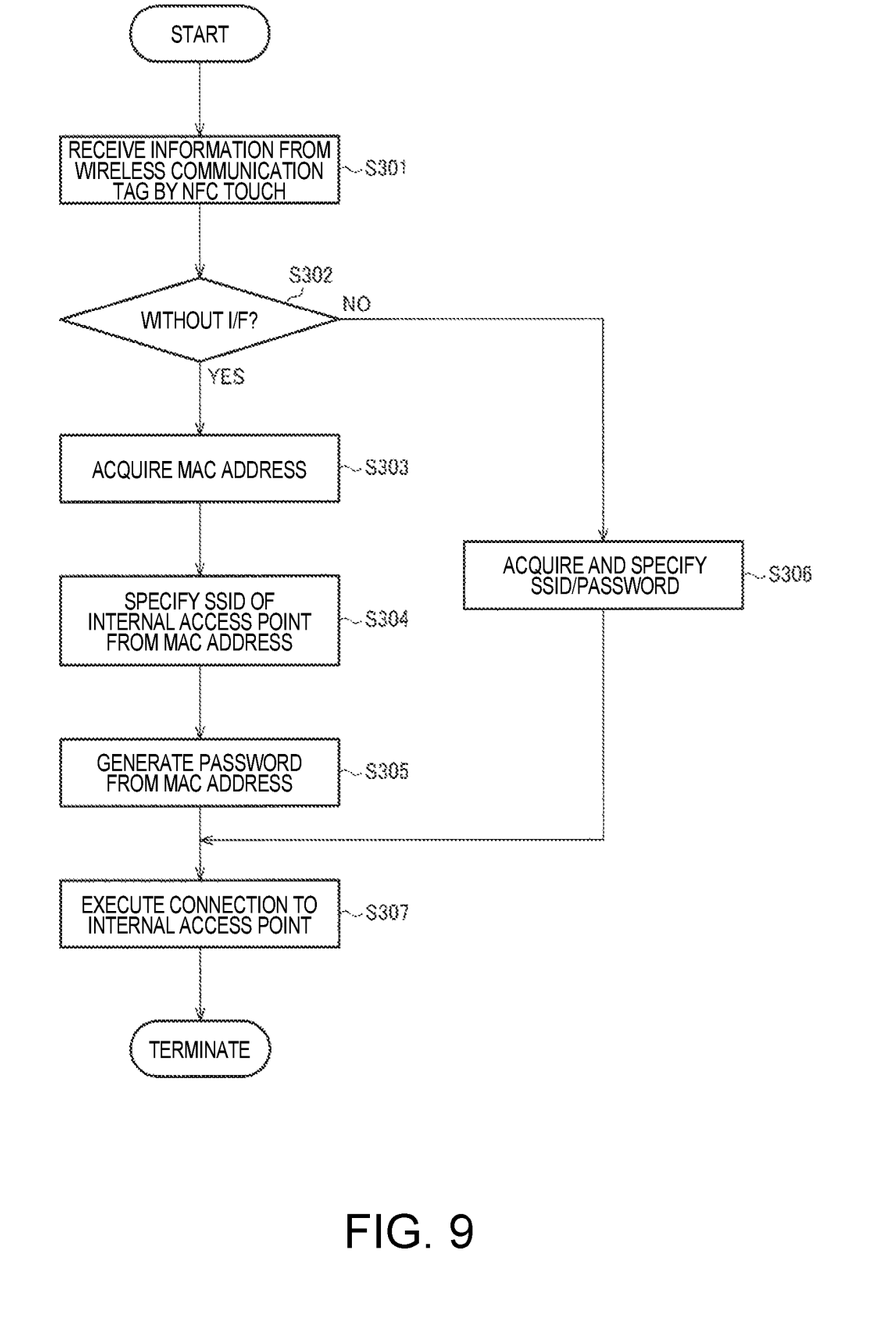
FIG. 9 is a flowchart for explaining processes in the terminal device.

FIG. 9 is a flowchart illustrating a process of the processing unit 110 of the terminal device 100 when establishing the connection with the electronic equipment 200. When the process is started, the information of the wireless communication tag is acquired via the first communication unit 121 based on the "NFC touch" (S301). As shown in FIGS. 4 and 7, the rewritability identifier indicating whether or not information stored in the wireless communication tag can be rewritten is stored in the wireless communication tag, and the first communication unit 121 receives the rewritability identifier from the wireless communication tag by wireless communication in accordance with the first communication method.

Then, based on the rewritability identifier, the processing unit 110 selects one of a plurality of specifying processes for specifying the identifier of the internal access point, executes the selected specifying process, and specifies the identifier of the internal access point. That is, the processing unit 110 determines whether or not the wireless communication tag is "without I/F" based on the rewritability identifier (S302), and branches the process depending on the determination result. In this way, by differentiating processes with and without I/F, it is possible to appropriately establish a connection with the electronic equipment 200 having the wireless communication tag "without I/F", and it is also possible to perform a flexible communication control that can cope with the password change when a case of "with I/F". Further, by performing the process shown in FIG. 9, regardless of whether the electronic equipment 200 is provided "with I/F" or "without I/F", the handover from NFC to Wi-Fi can be realized by using a same connection application (connection program). For the user, convenience can be improved since it is unnecessary to change the application to be introduced to the terminal device 100 according to the configuration of the electronic equipment 200.

As described above with reference to FIGS. 4 and 7, the identification information of the electronic equipment 200 is stored in the wireless communication tag in which the information stored in the wireless communication tag cannot be rewritten (without I/F), and the identifier of the internal access point is stored in the wireless communication tag in which the information stored in the wireless communication tag can be rewritten (with I/F).

When the rewritability identifier indicates that the information stored in the wireless communication tag cannot be rewritten (Yes in S302), the processing unit 110 acquires the MAC address from the wireless communication tag, and also acquires the MAC address from the beacon signal (S303). The processing unit 110 specifies the SSID of the internal access point based on the collation process between the MAC address received by the first communication unit 121 from the wireless communication tag in which the information cannot be rewritten and the MAC address included in the beacon signal (S304). Also, the processing unit 110 generates a password associated with the SSID based on the MAC address (S305).

On the other hand, when the rewritability identifier indicates that the information stored in the wireless communication tag can be rewritten (No in S302), the processing unit 110 specifies the identifier of the internal access point received by the first communication unit 121 from the wireless communication tag in which information can be rewritten as the identifier used for the communication with the electronic equipment 200 in accordance with the second communication method (S306). In the process of S306, the processing unit 110 specifies the password received from the wireless communication tag as the password used for the communication with the electronic equipment 200 in accordance with the second communication method.

Since the SSID and the password are specified by the processes of S304 and S305 or by the process of S306, the processing unit 110 executes a communication with the electronic equipment 200 in accordance with the second communication method, that is, a connection request to the internal access point of the electronic equipment 200 using the specified SSID and the password (S307).

3. Modification Example

As described above, convenience can be improved by the processing unit 210 of the electronic equipment 200 performing a process for receiving a change request of the SSID from the user. Similarly, the processing unit 210 of the electronic equipment 200 may be capable of receiving a password change request associated with the SSID.

When the wireless communication tag is provided "with I/F", since the password after changed is written in the wireless communication tag, the terminal device 100 can acquire the correct SSID and the password, and establish a connection with the electronic equipment 200, as shown in FIG. 8. However, when the wireless communication tag is provided "without I/F", since the password generated from the MAC address is the password before change, the terminal device 100 cannot establish a connection with the electronic equipment 200. If the connection is established by "NFC touch", it is necessary to restore the password to the password before change. However, from a user perspective, it is not easy to specify a reason why the connection is not established, and it is difficult to let the user voluntarily execute the resetting of the password.

Therefore, in a case where the identifier of the internal access point is specified based on the collation process between the identification information received from the wireless communication tag and the identification information included in the beacon signal and the connection with the electronic equipment 200 using the specified identifier and the password generated by the generation process is not established, the processing unit 110 of the terminal device 100 may determine that the password of the internal access point is changed and perform a notification process for prompting a user to reset the password.

The notification process here is executed using the display unit 130. For example, the processing unit 110 performs a process for displaying the notification screen including text information such as "Please reset password" on the display unit 130. Note that, an icon or an image may be used for displaying the notification. Further, the notification process may be executed by a notification unit (not shown). For example, a notification by light using a light emitting unit such as a light emitting diode (LED), a notification by sound using a speaker, a notification by vibration using a vibration unit such as a vibration motor, or the like can be considered.

Further, the processing unit 210 of the electronic equipment 200 performs a process for initializing the identifier of the internal access point and the password associated with the identifier. Specifically, when receiving an initialization operation from the user, the processing unit 210 performs a process for initializing the SSID of the internal access point and the password. It is not limited that the SSID and the password are both initialized, and one of the SSID and the password may be initialized. In this way, even when the wireless communication tag "without I/F" is used, it is possible to properly establish the connection in accordance with the second communication method.

When the connection between the terminal device 100 and the electronic equipment 200 cannot be established due to the password change of the internal access point, other setting items related to the second communication method, such as a communication channel, an encryption method, or the like, are considered to cause no problem even if the current setting is continuously used. That is, the process for initializing the SSID of the internal access point and the password is a process for initializing the SSID and the password in a narrow sense and not initializing other setting items.

Further, some or most of the processing of the terminal device 100 and the electronic equipment 200 of the present embodiment may be realized by a program. In this case, the terminal device 100 or the like of the present embodiment is realized by a processor such as a CPU executing a program. Specifically, a program stored in a non-transitory information storage medium is read, and the read program is executed by a processor such as a CPU. Here, the information storage medium stores a program, data, or the like, and functions of the information storage medium can be realized by an optical disk, an HDD, a memory, or the like. The information storage medium is a computer readable medium. A processor such as a CPU performs various processes of the present embodiment based on a program stored in the information storage medium. That is, in the information storage medium, a program for causing a computer to function as each unit of the present embodiment is stored. The computer is a device including an operation unit, a processing unit, a storage unit, and an output unit.

Although the embodiment to which the invention is applied and the modification example thereof have been described above, the invention is not limited to each embodiment or its modification example as it is, and at the implementation stage, the components can be modified and materialized within the scope not deviating from the gist of the invention. In addition, various inventions can be made by appropriately combining a plurality of components disclosed in each of the above-described each embodiment or the modification example. For example, some components may be deleted from the entire component described in each embodiment or the modification example. Further, components described in different embodiment or the modification example may be appropriately combined. Also, in the specification or the drawings, a term which described at least once with a different term in which meaning of the term is broader or similar, can be replaced with the different term at any part in the specification or the drawings. In this way, various modifications and applications are possible within the scope not deviating from the gist of the invention.

The entire disclosure of Japanese Patent Application No: 2018-010385, filed Jan. 25, 2018 is expressly incorporated by reference herein in its entirety.

What is claimed is:

1. A terminal device comprising:
a first communication unit that performs a wireless communication with a wireless communication tag of an electronic equipment in accordance with a first communication method;
a second communication unit that performs a wireless communication with the electronic equipment in accordance with a second communication method capable of performing a higher speed communication than the first communication method; and
a processing unit that performs a communication control of the first communication unit and the second communication unit,
wherein the first communication unit receives an identification information of the electronic equipment from the wireless communication tag by the wireless communication in accordance with the first communication method,
wherein the second communication unit receives a beacon signal which includes the identification information of the electronic equipment and an identifier of an internal access point of the electronic equipment and which is compliant with the second communication method, from the electronic equipment, and
wherein the processing unit specifies the identifier of the internal access point of the electronic equipment based on a collation process between the identification information of the electronic equipment received by the first communication unit and the identification information included in the beacon signal, and causes the second communication unit to establish the wireless communication with the electronic equipment in accordance with the second communication method using the specified identifier,
wherein a rewritability identifier, which indicates whether or not rewriting of information stored in the wireless communication tag is possible, is stored in the wireless communication tag,
wherein the first communication unit receives the rewritability identifier from the wireless communication tag by the wireless communication in accordance with the first communication method, and
wherein the processing unit selects any one of a plurality of specifying processes for specifying the identifier of the internal access point based on the rewritability identifier, executes the selected specifying process, and specifies the identifier of the internal access point.

2. The terminal device according to claim 1,
wherein the identification information of the electronic equipment is stored in the wireless communication tag in which information to be stored cannot be rewritten,
wherein the identifier of the internal access point is stored in the wireless communication tag in which information to be stored can be rewritten,
wherein, in a case where the rewritability identifier indicates that the information stored in the wireless communication tag cannot be rewritten, the processing unit specifies the identifier of the internal access point based on the collation process between the identification information received by the first communication unit from the wireless communication tag in which information cannot be rewritten and the identification information included in the beacon signal, and wherein, in a case where the rewritability identifier indicates that the information stored in the wireless communication tag can be rewritten, the processing unit specifies the identifier of the internal access point received by the first communication unit from the wireless communication tag in which information can be rewritten as the identifier used for a communication with the electronic equipment in accordance with the second communication method.

3. The terminal device according to claim 2,
wherein, in a case where the rewritability identifier indicates that the information stored in the wireless communication tag cannot be rewritten, the processing unit performs a generation process of a password associated with the identifier based on the identification information received by the first communication unit from the wireless communication tag in which information cannot be rewritten.

4. The terminal device according to claim 3,
wherein, in a case where the identifier of the internal access point is specified based on the collation process between the identification information received from the wireless communication tag and the identification information included in the beacon signal and a connection with the electronic equipment using the specified identifier and the password generated by the generation process is not established, the processing unit determines that the password of the internal access point is changed and performs a notification process for prompting a user to reset the password.

5. A communication system comprising:
the terminal device according to claim 1 and the electronic equipment,
wherein the electronic equipment includes a processing unit, and
wherein the processing unit of the electronic equipment performs a process for receiving a change request of the identifier of the internal access point from a user.

6. A communication system comprising:
the terminal device according to claim 2 and the electronic equipment,
wherein the electronic equipment includes a processing unit, and
wherein the processing unit of the electronic equipment performs a process for receiving a change request of the identifier of the internal access point from a user.

7. A communication system comprising:
the terminal device according to claim 3 and the electronic equipment,
wherein the electronic equipment includes a processing unit, and
wherein the processing unit of the electronic equipment performs a process for receiving a change request of the identifier of the internal access point from a user.

8. A communication system comprising:
the terminal device according to claim 4 and the electronic equipment,
wherein the electronic equipment includes a processing unit, and
wherein the processing unit of the electronic equipment performs a process for receiving a change request of the identifier of the internal access point from a user.

9. The communication system according to claim 5,
wherein the processing unit of the electronic equipment performs a process for initializing the identifier and a password associated with the identifier.

10. A non-transitory computer-readable recording medium in which a program is recorded, the program that causes a computer to function as:
a first communication unit that performs a wireless communication with a wireless communication tag of an electronic equipment in accordance with a first communication method;
a second communication unit that performs a wireless communication with the electronic equipment in accordance with a second communication method capable of performing a higher speed communication than the first communication method; and
a processing unit that performs a communication control of the first communication unit and the second communication unit,
wherein the first communication unit receives an identification information of the electronic equipment from the wireless communication tag by the wireless communication in accordance with the first communication method,
wherein the second communication unit receives a beacon signal which includes the identification information of the electronic equipment and an identifier of an internal access point of the electronic equipment and which is compliant with the second communication method, from the electronic equipment, and
wherein the processing unit specifies the identifier of the internal access point of the electronic equipment based on a collation process between the identification information of the electronic equipment received by the first communication unit and the identification information included in the beacon signal, and causes the second communication unit to establish the wireless communication with the electronic equipment in accordance with the second communication method using the specified identifier,
wherein a rewritability identifier, which indicates whether or not rewriting of information stored in the wireless communication tag is possible, is stored in the wireless communication tag,
wherein the first communication unit receives the rewritability identifier from the wireless communication tag by the wireless communication in accordance with the first communication method, and
wherein the processing unit selects any one of a plurality of specifying processes for specifying the identifier of the internal access point based on the rewritability identifier, executes the selected specifying process, and specifies the identifier of the internal access point.

* * * * *